United States Patent
Chen (10) Patent No.: US 8,023,193 B2
(45) Date of Patent: Sep. 20, 2011

(54) ILLUMINATION SYSTEM

(75) Inventor: S-Wei Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 754 days.

(21) Appl. No.: 11/848,913

(22) Filed: Aug. 31, 2007

(65) Prior Publication Data

US 2009/0059584 A1 Mar. 5, 2009

(51) Int. Cl.
*G02B 27/10* (2006.01)
(52) U.S. Cl. ........ 359/624; 359/621; 359/622; 359/623; 362/259; 362/330; 362/333; 362/339
(58) Field of Classification Search .......... 359/621–624; 362/259, 311.01, 311.06, 311.12, 326, 330, 362/331, 332, 333, 339
See application file for complete search history.

(56) References Cited

U.S. PATENT DOCUMENTS

| | | | |
|---|---|---|---|
| 4,939,630 A * | 7/1990 | Kikuchi et al. | 362/268 |
| 5,592,332 A | 1/1997 | Nishio et al. | |
| 5,900,982 A * | 5/1999 | Dolgoff et al. | 359/619 |
| 5,959,779 A * | 9/1999 | Yamazaki et al. | 359/624 |
| 7,030,383 B2 | 4/2006 | Babayoff et al. | |
| 7,186,004 B2 * | 3/2007 | Powell et al. | 362/244 |
| 7,304,731 B2 * | 12/2007 | Hill | 356/237.2 |
| 7,379,160 B2 * | 5/2008 | Toyoda | 355/67 |
| 7,486,444 B2 * | 2/2009 | Moriwaka | 359/619 |
| 7,554,737 B2 * | 6/2009 | Knox et al. | 359/599 |

* cited by examiner

*Primary Examiner* — Diane Lee
*Assistant Examiner* — Mary Zettl
(74) *Attorney, Agent, or Firm* — J.C. Patents (57) ABSTRACT

An illumination system including at least one coherent light source, a light uniforming device and a lenticular sheet module is provided. The coherent light source is capable of emitting a coherent beam. The light uniforming device is disposed on a transmission path of the coherent beam. The lenticular sheet module disposed on a transmission path of the coherent beam and between the coherent light source and the light uniforming device, includes a first lenticular sheet and a second lenticular sheet. The first lenticular sheet includes a plurality of first rod-like lenticulars disposed side by side extending along a first extending direction. The second lenticular sheet disposed between the first lenticular sheet and the light uniforming device, includes a plurality of second rod-like lenticulars disposed side by side extending along a second extending direction. The first extending direction and the second extending direction make an angle greater than 0 degree.

13 Claims, 9 Drawing Sheets

ILLUMINATION SYSTEM

BACKGROUND OF THE INVENTION

1. Field of the Invention

The present invention relates to an illumination system. More particularly, the present invention relates to an illumination system using a coherent light source.

2. Description of Related Art

Figure 1:
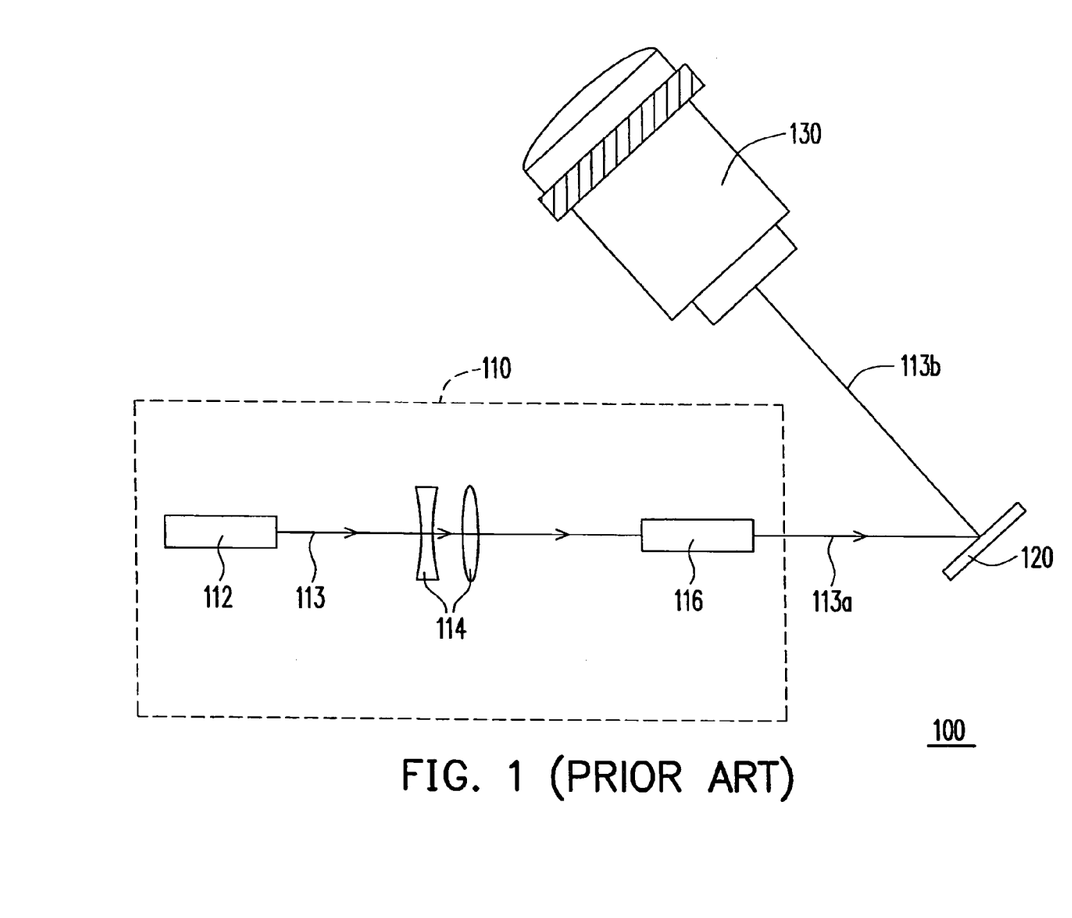
FIG. 1 is a schematic structural view of a conventional laser projection apparatus.

Referring to FIG. 1, a conventional laser projection apparatus 100 includes an illumination system 110, a digital micro-mirror device (DMD) 120 and a projection lens 130. The illumination system 110 includes a laser light source 112, a plurality of lenses 114 and a light integration rod 116. The laser beam 113 emitted from the laser light source 112 is expanded by the lenses 114 and uniformed by the light integration rod 116 to become an illumination beam 113a. After being projected onto the DMD, the illumination beam 113a is converted by the DMD into an image beam 113b. The image beam 113b is projected onto a screen (not shown) through the projection lens 130, thus forming a display image.

Because of the high coherence of the laser beam 113, a speckle pattern is generated in the display image on the screen due to the interference phenomenon of the laser beam 113 after the laser beam 113 passes through optical components (such as a lens, a reflector, etc.) having a slightly uneven surface in the laser projection apparatus 100. The speckle pattern is an irregular noise pattern. The speckle phenomenon causes a non-uniform brightness of the display image, thus degrading the display quality of the laser projection apparatus 100.

SUMMARY OF THE INVENTION

The present invention is directed to an illumination system, which effectively reduces the degree of the speckle phenomenon.

Other advantages of the present invention can be further understood from the technical features disclosed by the present invention.

An embodiment of the present invention provides an illumination system including at least one coherent light source, a light uniforming device and a lenticular sheet module. The coherent light source is capable of emitting a coherent beam. The light uniforming device is disposed on a transmission path of the coherent beam. The lenticular sheet module is disposed on the transmission path of the coherent beam and between the coherent light source and the light uniforming device. The lenticular sheet module includes a first lenticular sheet and a second lenticular sheet. The first lenticular sheet includes a plurality of first rod-like lenticulars side by side extending along a first extending direction. The second lenticular sheet is disposed between the first lenticular sheet and the light uniforming device. The second lenticular sheet includes a plurality of second rod-like lenticulars side by side extending along a second extending direction. The first extending direction and the second extending direction make an angle greater than 0 degree.

In the illumination system, the coherent beam is partitioned into many parts by the lenticular sheet module, and then the many parts of the coherent beam are incident on various positions of the light uniforming device with various incident angles, so as to reduce the degree of the speckle phenomenon.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 2A:
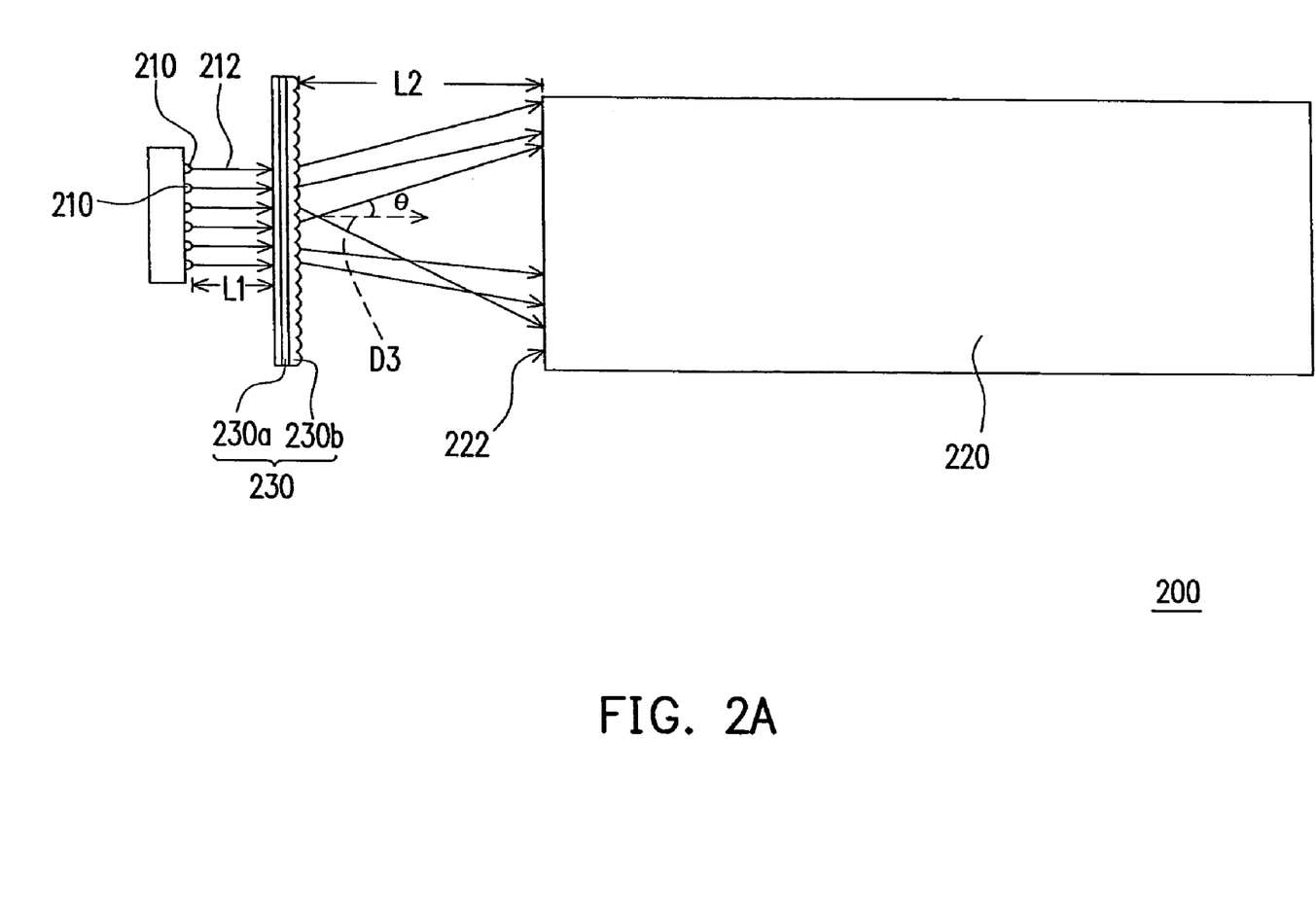
FIG. 2A is a schematic structural view of an illumination system according to an embodiment of the present invention.
Figure 2B:
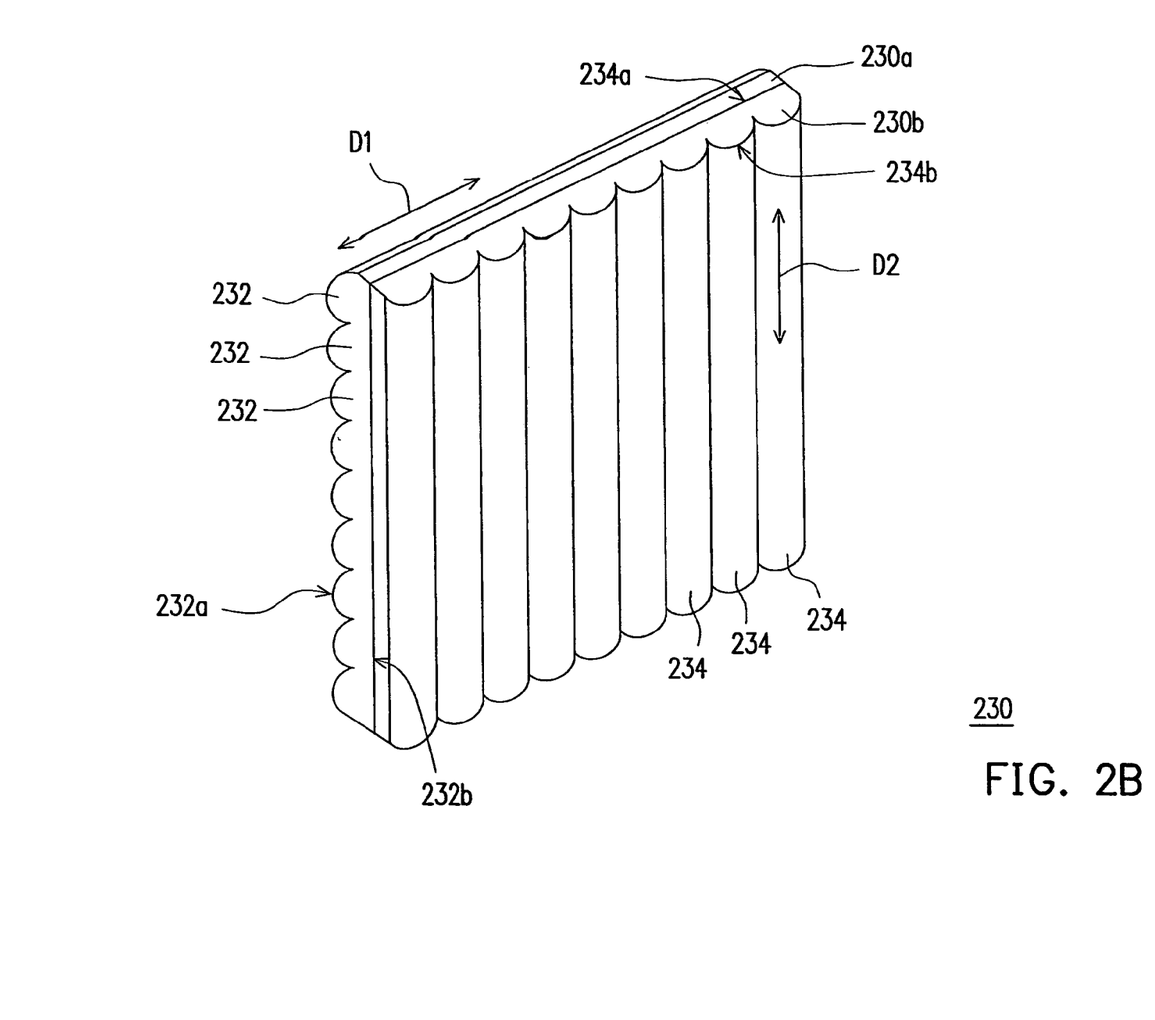
FIG. 2B is a schematic perspective view of the lenticular sheet module in FIG. 2A.
Figure 2C:
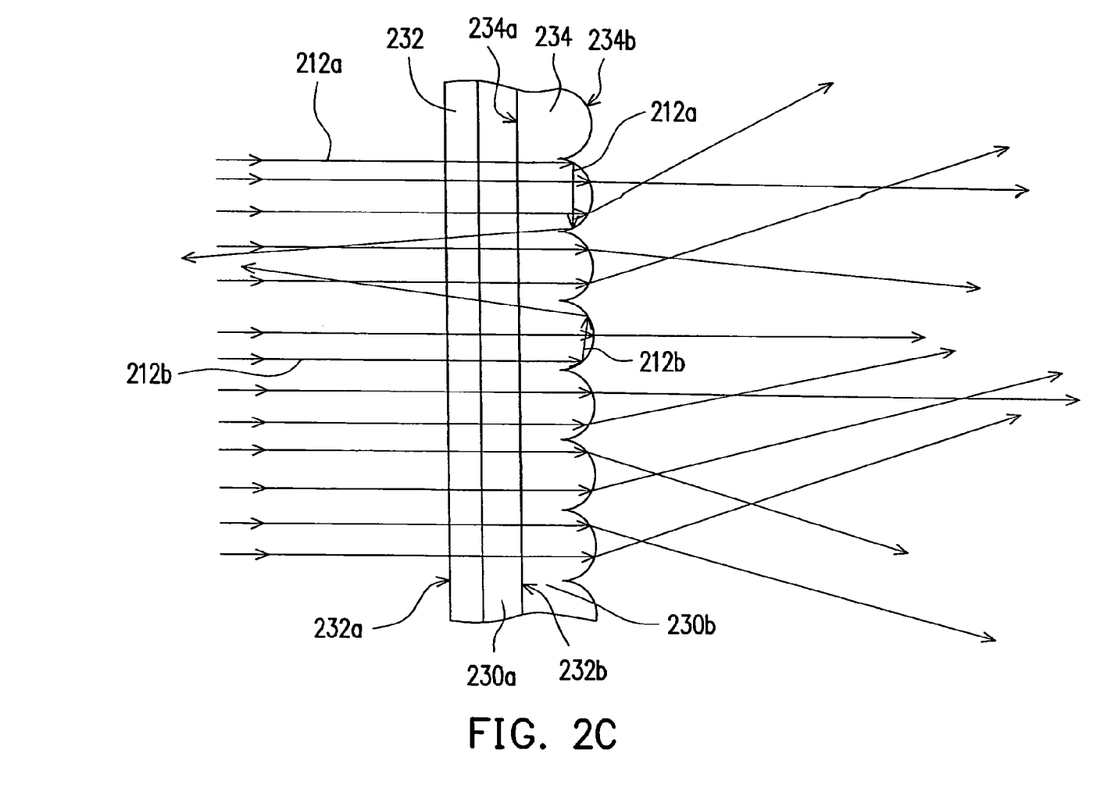
FIG. 2C is a local magnified view showing coherent beams projected onto the lenticular sheet module in FIG. 2A.

FIG. 2A is a schematic structural view of an illumination system according to an embodiment of the present invention, FIG. 2B is a schematic perspective view of the lenticular sheet module in FIG. 2A, and FIG. 2C is a local magnified view showing coherent beams projected onto the lenticular sheet module in FIG. 2A. Referring to FIGS. 2A to 2C, an illumination system 200 in the present embodiment is applied in a projection apparatus (not shown). The illumination system 200 includes a plurality of coherent light sources 210, a light uniforming device 220 and a lenticular sheet module 230. Each coherent light source 210 is capable of emitting a coherent beam 212. In the present embodiment, each coherent light source 210 is, for example, a laser for emitting the coherent beam 212 which are highly collimated. The coherent light sources 210 are arranged in an array in the present embodiment. However, the coherent light sources are also arranged in other forms in other embodiments. The light uniforming device 220 is disposed on transmission paths of the coherent beams 212. In the present embodiment, the light uniforming device 220 is, for example, a light integration rod for uniforming the coherent beams 212. However, in other embodiments, the light uniforming device is also a lens array.

The lenticular sheet module 230 is disposed on the transmission paths of the coherent beams 212 and between the coherent light sources 210 and the light uniforming device 220. Besides, the lenticular sheet module 230 includes a first lenticular sheet 230a and a second lenticular sheet 230b. The first lenticular sheet 230a includes a plurality of first rod-like lenticulars 232 side by side extending along a first extending direction D1. The second lenticular sheet 230b is disposed between the first lenticular sheet 230a and the light uniforming device 220. The second lenticular sheet 230b includes a plurality of second rod-like lenticulars 234 side by side extending along a second extending direction D2. The first extending direction D1 and the second extending direction D2 make an angle greater than 0 degree.

In the present embodiment, each of the first rod-like lenticulars 232 has a first convex surface 232a and a first plane surface 232b. The first convex surface 232a protrudes away from the second lenticular sheet 230b. The first plane surface 232b is located between the first convex surface 232a and the second lenticular sheet 230b, and faces the second lenticular sheet 230b. Each of the second rod-like lenticulars 234 has a second plane surface 234a and a second convex surface 234b. The second plane surface 234a faces the first lenticular sheet 230a. The second convex surface 234b protrudes away from the first lenticular sheet 230a. The second plane surface 234a is located between the first lenticular sheet 230a and the second convex surface 234b.

The first lenticular sheet 230a spread the coherent beams 212 along the direction perpendicular to the first extending direction D1, and the second lenticular sheet 230b spread the coherent beams 212 along the direction perpendicular to the second extending direction D2. For projecting a rectangular light spot onto a light input end 222 of the light uniforming device 220, the first extending direction D1 is substantially perpendicular to the second extending direction D2 in the present embodiment. In addition, parts of the coherent beams 212 (such as the light rays 212a and 212b shown in FIG. 2C) are totally internally reflected by the edges of the second convex surfaces 234b and cannot travel to the light uniforming device 220. In the present embodiment, the radius of curvature of each second convex surface 234b is larger than or equal to the radius of curvature of each first convex surface 232a. To reduce or prevent the total internal reflection on the second convex surfaces 234b, the radius of curvature of each second convex surface 234b is preferably larger, for example, larger than the radius of curvature of each first convex surface 232a. Moreover, the second lenticular sheet 230b spreads the coherent beams 212 wider than the first lenticular sheet 230a spreads the coherent beams 212 when the radius of curvature of each first convex surface 232a is equal to the radius of curvature of each second convex surface 234b, and thus the radius of curvature of each second convex surface 234b is preferably larger than the radius of curvature of each first convex surface 232a for projecting a square light spot onto the light input end 222 of the light uniforming device 220.

Figure 3A:
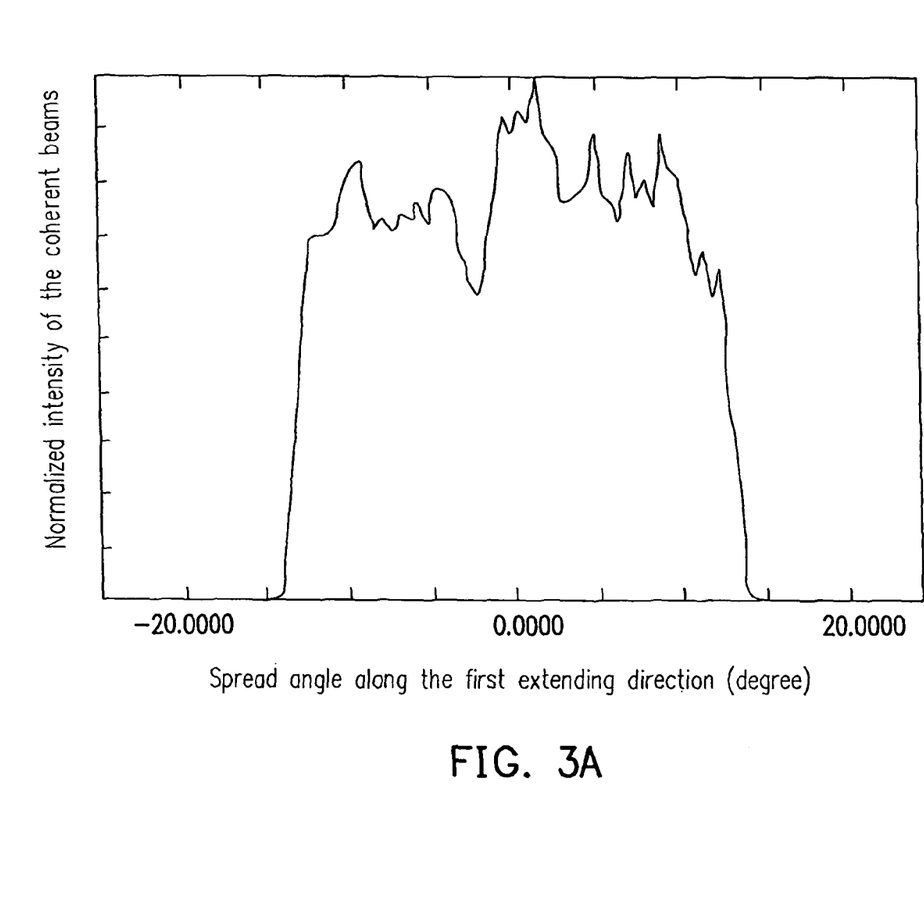
FIG. 3A is an optical simulation diagram of the intensity of the coherent beams vs. the spread angle along the first extending direction in the illumination system in FIG. 2A.
Figure 3B:
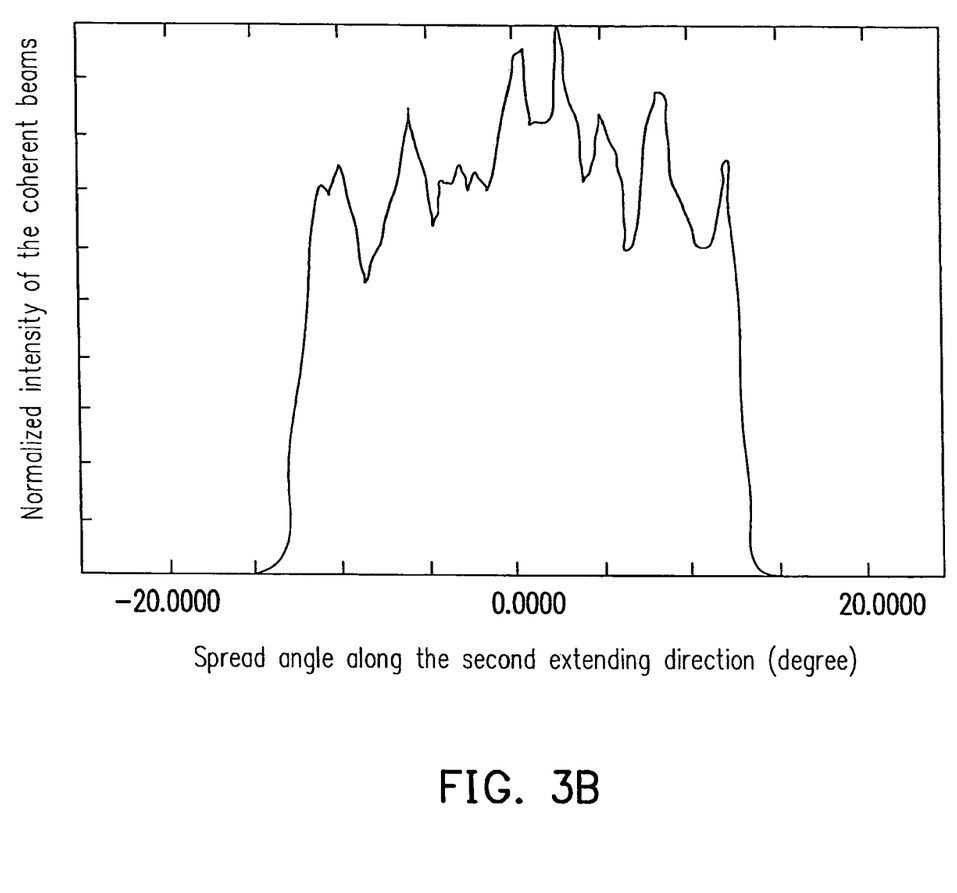
FIG. 3B is an optical simulation diagram of the intensity of the coherent beams vs. the spread angle along the second extending direction in the illumination system in FIG. 2A.

For example, in an embodiment of the present invention, the radius of curvature of each first convex surface 232a is about 0.2 millimeters (mm), the radius of curvature of each second convex surface 234b is about 0.215 mm, the thickness of each of the first lenticular sheet 230a and the second lenticular sheet 230b is about 0.28 mm, the pitches of both the first convex surfaces 232a and the second convex surfaces 234b are about 0.1414 mm, the linear densities of both the first convex surfaces 232a and the second convex surfaces 234b are about 180 lines per inch. In addition, an optical simulation diagram of the intensity of the coherent beams 212 vs. the spread angle along the first extending direction D1 according to the present embodiment is shown in FIG. 3A, and an optical simulation diagram of the intensity of the coherent beams 212 vs. the spread angle along the second extending direction D2 according to the present embodiment is shown in FIG. 3B. It can be understood from FIGS. 3A and 3B that the light spot projected onto the light input end 222 of the light uniforming device 220 is about square. It should be noted that the above data of the first lenticular sheet 230a and the second lenticular sheet 230b and FIGS. 3A and 3B are illustrated as an example, and the present invention is not limited thereto as such. Moreover, the shape of the light spot projected onto the light input end 222 of the light uniforming device 220 is not limited to square or rectangle. In other embodiments, the light spot may be other shapes.

In the present embodiment, the first lenticular sheet 230a is integrally formed. Moreover, the second lenticular sheet 230b is also integrally formed. In addition, the first lenticular sheet 230a and the second lenticular sheet 230b lean against each other in the present embodiment, and the lenticular sheet module 230 is the combination of the independent first lenticular sheet 230a and the independent second lenticular sheet 230b. However, in other embodiments, the lenticular sheet module 230 is also integrally formed.

In the illumination system 200 of the present embodiment, each coherent beam 212 is partitioned into many parts by the lenticular sheet module 230, and then the many parts of the coherent beams 212 are incident on various positions of the light uniforming device with various incident angles, so as to reduce the degree of the speckle phenomenon. Therefore, a projection apparatus using the illumination system 200 may project display images with more uniform brightness.

In the present embodiment, each coherent beam 212 emitted from the coherent light source 210 has a slight spread angle, such that a first distance L1 between the coherent light source 210 and the first lenticular sheet 230a is larger than 1 mm, so as to increase the number of the first convex surface 232a and the second convex surface 234b on which one coherent beam 212 is projected, thus enhancing the brightness uniformity of the light spot projected onto the light uniforming device 220. Therefore, the brightness uniformity of the display images projected by the projection apparatus is improved. In addition, a direction of each coherent beam 212 exiting from the second lenticular sheet 230b and a direction D3 perpendicular to and away from the second lenticular sheet 230b make an angle θ falling within a range from −30 degrees to 30 degrees, which is achieved by setting larger radii of curvature of the first convex surfaces 232a and the second convex surfaces 234b, so as to increase the proportion of the coherent beams 212 projected onto the light uniforming device 220, thus reducing the energy loss. Moreover, a second distance L2 between the second lenticular sheet 230b and the light uniforming device 220 is smaller than 10 mm, which also increases the proportion of the coherent beams 212 projected onto the light uniforming device 220.

It should be noted that the number of the coherent light sources in the illumination system in the present invention is not limited to be plural. In other embodiments, an illumination system may include a single coherent light source.

Figure 4A:
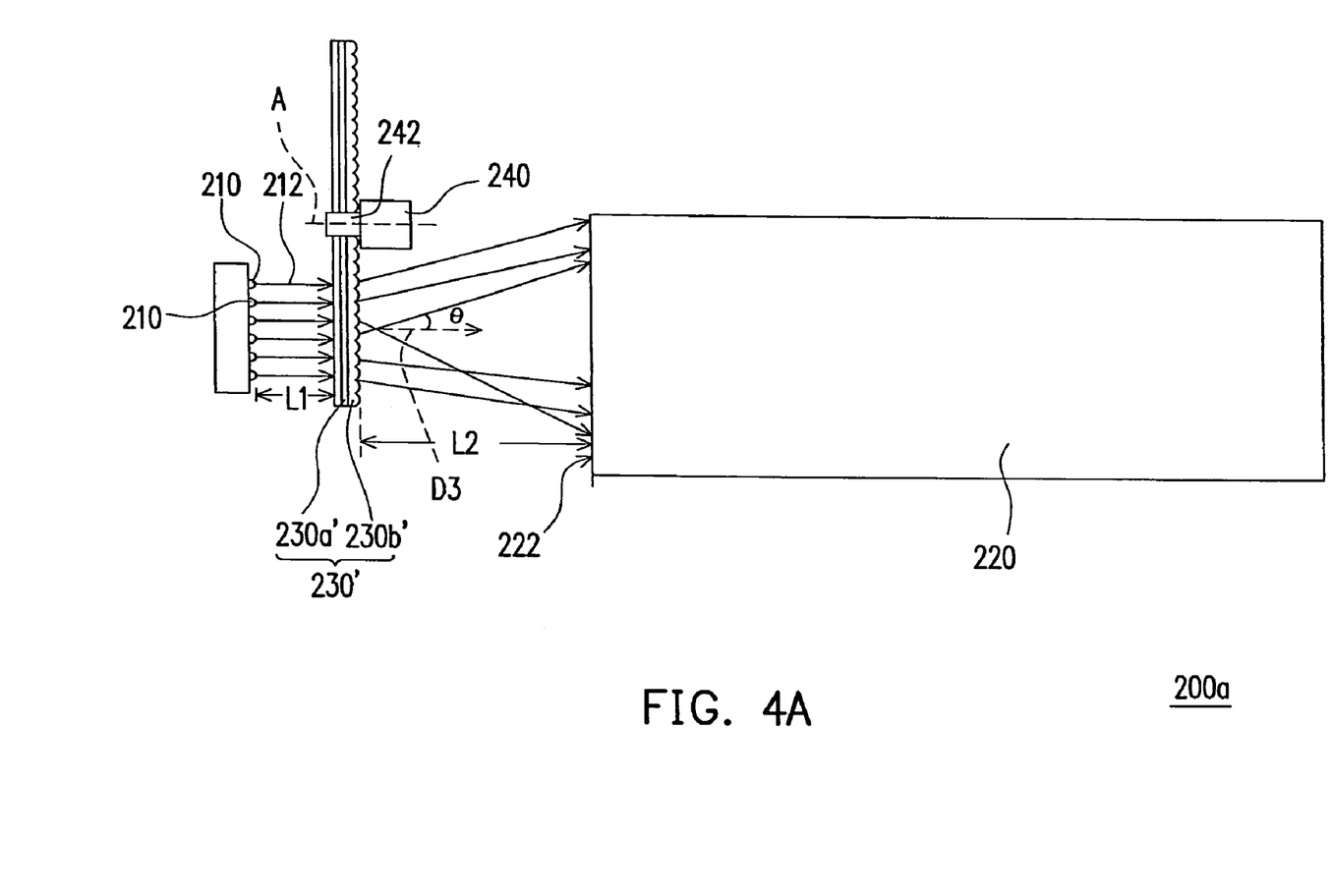
FIG. 4A is a schematic structural view of an illumination system according to another embodiment of the present invention.
Figure 4B:
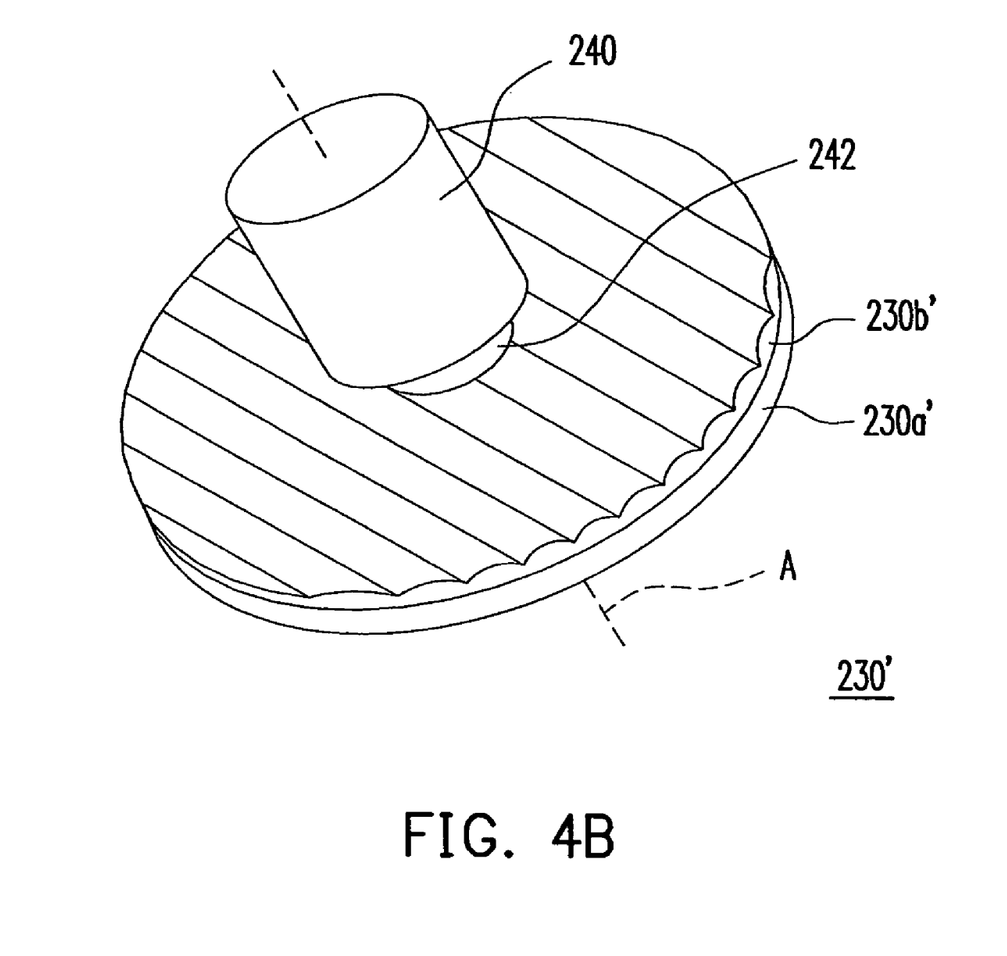
FIG. 4B is a schematic perspective view of a lenticular sheet module and an actuator of the illumination system in FIG. 4A.

FIG. 4A is a schematic structural view of an illumination system according to another embodiment of the present invention. FIG. 4B is a schematic perspective view of a lenticular sheet module and an actuator of the illumination system in FIG. 4A. Referring to FIGS. 4A and 4B, an illumination system 200a of the present embodiment is similar to the above illumination system 200 shown in FIG. 2A, except for the following differences. The illumination system 200a further includes an actuator 240 connected with a lenticular sheet module 230', for driving the lenticular sheet module 230' to move. In this embodiment, the lenticular sheet module 230' is, for example, annular-shaped. In other words, a first lenticular sheet 230a' and a second lenticular sheet 230b' of the lenticular sheet module 230' are both annular-shaped. In addition, the actuator 240 is, for example, a motor having a rotor 242. The lenticular sheet module 230' surrounds and is connected with the rotor 242 for making the lenticular sheet module 230' be driven by the actuator 240 and rotate about an axis A passing through the center of the lenticular sheet module 230'. In other embodiment, the actuator is also piezoelectric actuator for driving the lenticular sheet module 230 to oscillate, for example. The kind of the actuator 240 in the illumination system in the present invention is not limited. Besides, the lenticular sheet module connected with the actuator is not limited to be annular-shaped in the present invention, and it may be in other shapes, such as the shape in FIG. 2B, in other embodiments. Because of the rotation of the lenticular sheet module 230', the spot projected onto the light uniforming device 220 also rotates, and thus the speckle pattern output by the illumination system 200a changes with time. Due to visual persistence effect, the human eyes observe the superposition of the speckle patterns at different time points in a visual persistence time interval. The speckle distributions in the speckle patterns at different time points are different, such that a pattern having more uniform brightness is observed by the human eyes after the superposition. Therefore, the illumination system 200a in the present embodiment more effectively reduces the degree of the speckle phenomenon.

Experimental results show that the speckle ratio of the speckle pattern generated by the illumination system 200a in the present embodiment is about 6%, and the speckle ratio of the illumination system without using the lenticular sheet module 230' is about 17%, in which the speckle ratio is defined as the ratio of a brightness standard deviation of the points in the speckle pattern to an average brightness of the points. Compared to the illumination system without using the lenticular sheet module 230', the illumination system 200a in the present embodiment has the speckle ratio reduced by about 11/17, thereby the degree of the speckle phenomenon in the illumination system 200a is indeed effectively reduced. However, the degree of reducing the speckle phenomenon of the present embodiment is illustrated as an example, and is not intended to limit the scope of the present invention as such.

Figure 5:
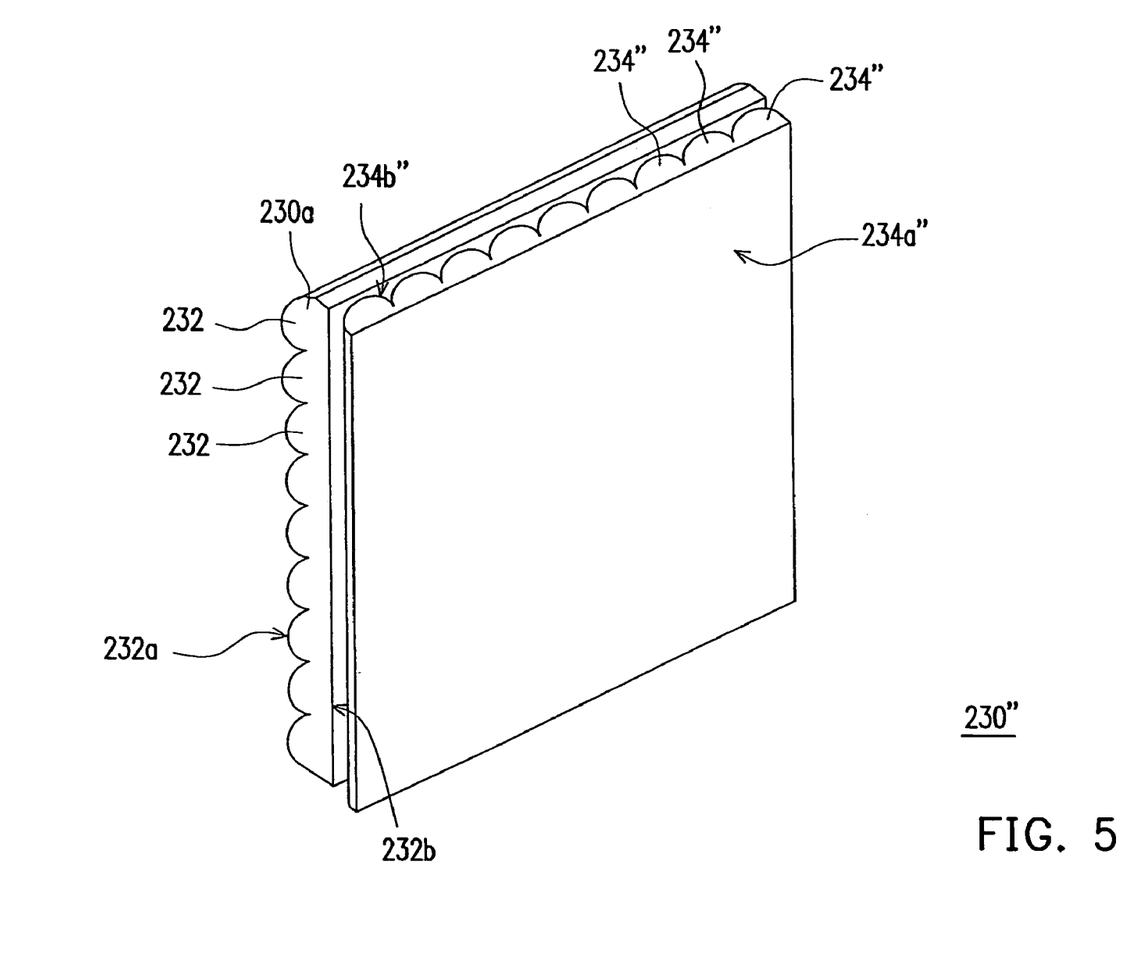
FIG. 5 is a schematic perspective view of a lenticular sheet module of an illumination system according to yet another embodiment of the present invention.

FIG. 5 is a schematic perspective view of a lenticular sheet module of an illumination system according to yet another embodiment of the present invention. Referring to FIG. 5, a lenticular sheet module 230" of an illumination system of the present embodiment is similar to the above lenticular sheet module 230 shown in FIG. 2B except for the differences described below. In the lenticular sheet module 230", a second convex surface 234b" of each second rod-like lenticular 234" protrudes toward the first lenticular sheet 230a. In addition, a second plane surface 234a" of each second rod-like lenticular 234" faces away from the first lenticular sheet 230a. The second convex surface 234b" is located between the first lenticular sheet 230a and the second plane surface 234a". The illumination system using the lenticular sheet module 230" has similar advantages as those of the above illumination system 200 shown in FIG. 2A.

According to the above description, in the illumination system, the coherent beam is partitioned into many parts by the lenticular sheet module, and then the many parts of the coherent beam are incident on various positions of the light uniforming device with various incident angles, so as to reduce the degree of the speckle phenomenon. Therefore, a projection apparatus using the illumination system may project display images with more uniform brightness. In addition, the lenticular sheet module also rotates, so as to further reduce the degree of the speckle phenomenon.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising:
   at least one coherent light source, capable of emitting a coherent beam;
   a light uniforming device, disposed on a transmission path of the coherent beam;
   a lenticular sheet module disposed on the transmission path of the coherent beam and between the coherent light source and the light uniforming device, the lenticular sheet module being annular-shaped, the lenticular sheet module comprising:
      a first lenticular sheet, comprising:
         a plurality of first rod-like lenticulars, side by side extending along a first extending direction; and
      a second lenticular sheet, disposed between the first lenticular sheet and the light uniforming device, the second lenticular sheet comprising:
         a plurality of second rod-like lenticulars, side by side extending along a second extending direction, wherein the first extending direction and the second extending direction make an angle greater than 0 degree, each of the first rod-like lenticulars has a first convex surface, each of the second rod-like lenticulars has a second convex surface, and a radius of curvature of each second convex surface is larger than or equal to a radius of curvature of each first convex surface;
      wherein a direction of the coherent beam exiting from the second lenticular sheet and a direction perpendicular to and away from the second lenticular sheet make an angle falling within a range from −30 degrees to 30 degrees; and
   a motor having a rotor, wherein the lenticular sheet module surrounds and is connected with the rotor for making the lenticular sheet module rotate about an axis passing through a center of the lenticular sheet module, and the first extending direction and the second extending direction of portions of the first rod-like lenticulars and the second rod-like lenticulars struck by the coherent beam rotate with respect to the coherent beam when the lenticular sheet module rotates.

2. The illumination system as claimed in claim 1, wherein the first extending direction is substantially perpendicular to the second extending direction.

3. The illumination system as claimed in claim 1, wherein the first convex surface protrudes away from the second lenticular sheet, the second convex surface protrudes away from the first lenticular sheet, each of the first rod-like lenticulars further has a first plane surface located between the first convex surface and the second lenticular sheet and facing the second lenticular sheet, each of the second rod-like lenticulars further has a second plane surface facing the first lenticular sheet, and the second plane surface is located between the first lenticular sheet and the second convex surface.

4. The illumination system as claimed in claim 1, wherein the first convex surface protrudes away from the second lenticular sheet, the second convex surface protrudes toward the first lenticular sheet, each of the first rod-like lenticulars further has a first plane surface located between the first convex surface and the second lenticular sheet and facing the second lenticular sheet, each of the second rod-like lenticulars further has a second plane surface facing away from the first lenticular sheet, and the second convex surface is located between the first lenticular sheet and the second plane surface.

5. The illumination system as claimed in claim 1, wherein the first lenticular sheet and the second lenticular sheet lean against each other.

6. The illumination system as claimed in claim 1, wherein a first distance between the coherent light source and the first lenticular sheet is larger than 1 millimeter.

7. The illumination system as claimed in claim 1, wherein a second distance between the second lenticular sheet and the light uniforming device is smaller than 10 millimeters.

8. The illumination system as claimed in claim 1, wherein the light uniforming device comprises a light integration rod or a lens array.

9. The illumination system as claimed in claim 1, wherein a number of the at least one coherent light source is more than one, and the coherent light sources are arranged in an array.

10. The illumination system as claimed in claim 1, wherein the coherent light source includes a laser.

11. The illumination system as claimed in claim 1, wherein the first lenticular sheet is integrally formed.

12. The illumination system as claimed in claim 1, wherein the second lenticular sheet is integrally formed.

13. The illumination system as claimed in claim 1, wherein the lenticular sheet module is integrally formed.

* * * * *